Figure 1:
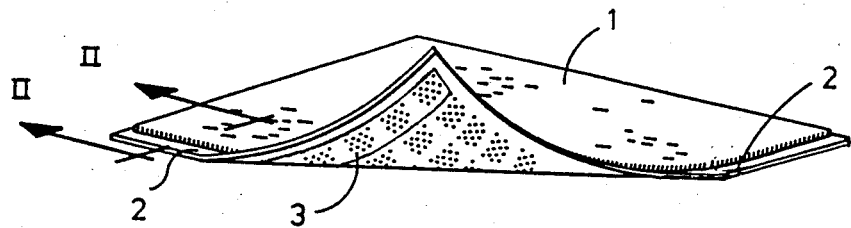

United States Patent [19]

Lang

[11] Patent Number: 4,902,554
[45] Date of Patent: Feb. 20, 1990

[54] VULCANIZED RUBBER ARTICLE, METHOD FOR PRODUCTION OF SAME, AND LABEL TO BE USED FOR THE METHOD

[75] Inventor: Aage Lang, Kolind, Denmark

[73] Assignee: Milliken Research Corporation, Spartanburg, S.C.

[21] Appl. No.: 257,319

[22] Filed: Oct. 13, 1988

[30] Foreign Application Priority Data

Jun. 30, 1988 [DK] Denmark .............................. 3642/88

[51] Int. Cl.⁴ .................................................. B32B 3/00
[52] U.S. Cl. ...................................... 428/195; 428/457; 428/493; 428/495; 15/216; 40/587; 156/230; 156/233; 156/234
[58] Field of Search ............................ 15/216; 40/587; 428/195, 457, 493, 495; 156/230, 233, 234

[56] References Cited

U.S. PATENT DOCUMENTS

| | | | |
|---|---|---|---|
| 2,169,146 | 8/1939 | Iverson | 18/17 |
| 2,225,107 | 12/1940 | Galkin | 15/216 |
| 2,663,902 | 12/1953 | Anderson | 18/17 |
| 3,183,551 | 5/1965 | Johnson | 18/2 |
| 3,311,951 | 4/1967 | Borchard et al. | 18/2 |
| 3,671,159 | 6/1972 | Greenberg et al. | 425/158 |
| 3,825,378 | 7/1974 | Dart et al. | 425/4 R |
| 3,872,786 | 3/1975 | Holton | 100/218 |
| 4,343,342 | 8/1982 | McDonald | 40/587 |
| 4,447,201 | 5/1984 | Knudsen | 425/397 |

*Primary Examiner*—Ellis P. Robinson
*Assistant Examiner*—P. J. Ryan
*Attorney, Agent, or Firm*—Earle R. Marden; H. Williams Petry

[57] ABSTRACT

In that a vulcanized rubber article (8), preferably of sheet or plate form and preferably having a relief pattern, in at least part of its surface, integrated in any surface area, inserted or settled into same, has been provided and vulcanized together with a rubber material (6) in the form of letters, signs, and digits in at least one color deviating from the rubber article (8) color composition, and that the rubber material (6) has a vulcanizing temperature range matching that of the rubber article (8), a hardwearing and washproof as well as distinct marking of the rubber article is obtained. A label to be used for the marking of the rubber article consists of a foil material (10) of a thickness of 10-100 micron upon which using a printing ink (11) of rubber material inverted text, figures and/or pictures have been printed.

7 Claims, 1 Drawing Sheet

U.S. Patent  Feb. 20, 1990  4,902,554

VULCANIZED RUBBER ARTICLE, METHOD FOR PRODUCTION OF SAME, AND LABEL TO BE USED FOR THE METHOD

The invention concerns a vulcanized rubber article, preferably of sheet or plate form and preferably given a relief pattern, at least in part of its surface.

It is known to mark any such rubber article by letters, signs, figures, and/or figures by making indentations or elevations in the rubber article shaped such as said letters, signs, etc. One drawback to elevations is that these are worn away quickly if the rubber article is exposed to wear, and one drawback about the indentations is that these weaken the material at the particular point.

It is also known to apply letters, signs, and figures, etc. by the silk screen printing method or using film printing, and one drawback to this is also that the marking is worn away easily as the rubber article is worn.

It is the purpose of the present invention to produce a vulcanized rubber article marked so that there will be no appreciable material strength reduction, and that a distinct, highly wearable marking will still be obtained.

This is achieved by a vulcanized rubber article of the invention wherein integrated in any surface area inserted or settled into same it has been provided and vulcanized with a rubber material in the form of letters, signs, and figures in at least one colour deviating from the rubber article colour composition, and that the rubber material has a vulcanizing temperature range matching that of the rubber article. Thus, a solid marking rich in contrast is obtained, the rubber material as it were having been cast into the rubber article surface, not to disappear until the rubber article has been worn down corresponding to the depth of the marking signs in the rubber article.

Where the rubber article is in the form of a service mat, the signs are appropriately vulcanized into the mat backing. Thus preventing any aesthetically disturbing marking on the mat top, and the marking is positioned so as to cause a minimum of wear and thus a maximum of life.

The rubber material integrated in the rubber article has been appropriately selected among such materials as are compatible with at least one material in the group of: Nitrile latex, natural latex, styrene butadiene rubber, natural rubber, nitrile rubber or carboxylated rubber, and rubber is to be understood as natural and synthetic rubbers.

The invention also concerns a method for production of a vulcanized rubber article with a hardwearing and washproof, and distinct marking; the characteristics of the method will appear from which is stated below.

Further, this invention concerns a label to be used for the method for the production of the vulcanized rubber article, this label being characteristic in that it consists of a foil or sheet material of a thickness of 10–100 micron upon which has been imprinted, in printing ink of vulcanizable rubber material, inverted text, figures, and/or pictures.

Figure 2:
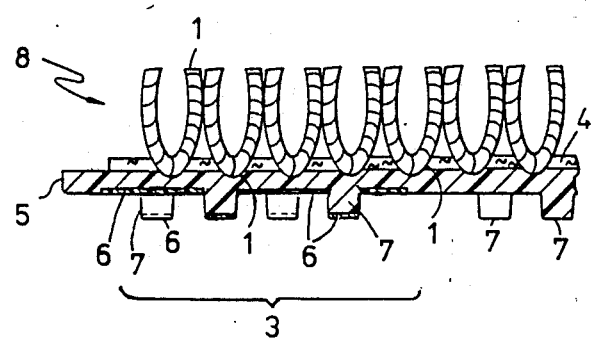
Figure 3:
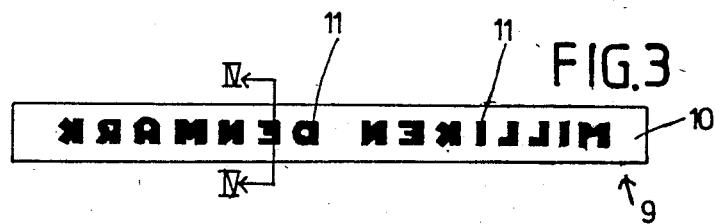
Figure 4:
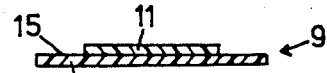
Figure 5:
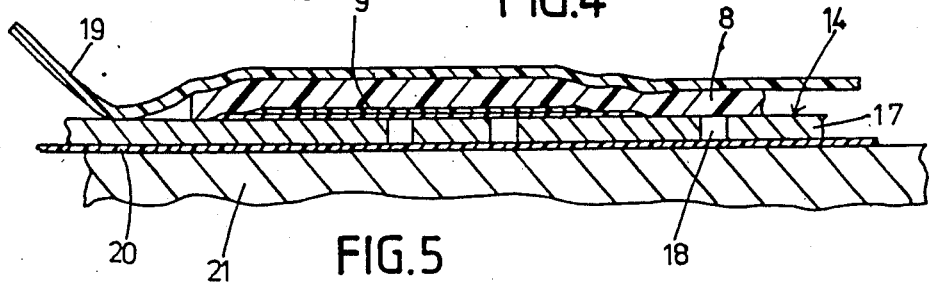

Below, the invention will be further explained in relation to one embodiment and with reference to the drawing where FIG. 1 shows a service mat with a text provided area of the invention on its backing, FIG. 2 shows a section along II—II in FIG. 1, FIG. 3 shows a label to the invention imprinted with inverted text, FIG. 4 shows a section along IV—IV in FIG. 3, and FIG. 5 shows a detail of a section through a vulcanizing press where a rubber article is given a marking to the invention.

At the top, the service mat shown in FIG. 1 has a pile 1 and an encircling, free rubber edge 2 while at its backing is has projections arranged group by group. Further, at its backing a label area 3 has been shown within which a hard-wearing and wash-proof, and distinct marking is require.

FIG. 2 shows a section along II—II in FIG. 1, clearly showing the pile 1 fixed in a textile layer 4 which has, with the pile 1, been vulcanized together with the mat backing 5. At the surface of the backing layer bottom side, a rubber material 6 has been vulcanized in the form of letters, signs, and figures in a colour deviating from the mat backing 5, said rubber material having a vulcanizing temperature or range corresponding to that of the mat backing rubber material. Signs 6 are seen in label area 3 also to be inserted or settled in the mat backing 5 projection 7. The rubber material 6 may in FIG. 2 be a sign, for instance the letter I, across the entire label area 3. In FIGS. 1 and 2, the vulcanized rubber article 8 is a service mat but could also be for instance an automobile mat of rubber. Rubber material 6, integrated in rubber article 8, has been selected from such materials as are compatible with at least one material in the group of nitrile latex, natural latex, styrene butadiene rubber or carboxylated rubber, and rubber is to be understood as natural as well as synthetic rubber.

The method to be applied for the production of the vulcanized rubber article, in this case the service mat with a hardwearing and washproof, as well as distinct marking, is characteristic in the way of the follow method steps: (a) a label 9 is made of which an embodiment is shown in FIG. 3 in the form of a plastic foil 10 which is imprinted with at least one printing ink 11 by a vulcanizable rubber material 6 in the form of inverted letters, signs, digits and/or figures, said printing 11 deviating from the rubber article 8 colour composition but having virtually the same vulcanizing temperature as that of the rubber article 8, (b) the label is placed on a moulding surface 14 to which a vulcanizable rubber article 8 is to be made to shape during a press vulcanizing process in connection with which the label 9 is placed with its imprinted side 15 facing away from the moulding surface 14, (c) the vulcanizable rubber article 8 is placed on the moulding surface 14 over the printed plastic foil 10, (d) a press vulcanizing process is initiated by applying a compression moulding pressure against the rubber article 8 on the moulding surface 14 under simultaneous heating to the vulcanizing temperature range, (e) the compression moulding pressure is made to stop after the vulcanizing, and the article 8 with the rubber material 6 now integrated in this and also vulcanized is cooled, (f) the plastic foil 10 may be removed, for instance by tearing, (g) the melting point of the plastic foil 10 used is higher than the vulcanizing temperature used.

The press vulcanizing process is, as an example, illustrated in FIG. 5 where a surface structure is required on the back of a mat, for instance a service mat, having a front pile vulcanized together with a layer of vulcanizable, flexible material 8, such as rubber, or a thermoplastic material constituting the bottom layer of the mat in which said surface structure is to be produced on the mat backing. In the example shown, the rubber article 8 is the edge of such a service mat or a rubber mat entirely without any front pile. The flexible layer 8 is placed bearing against the virtually uncompressible structure-conveying structural sheet or plate 17 where in this case the structure is constituted by openings 18 through which the article 8 may be plastically deformed during the vulcanizing process, and the structure or the openings 18 may be replaced by indentations in the structural sheet or plate 17; said indentations may have greatly varying designs, complementary to the structure required to be given to the rubber article 8 bottom side. The layer 8 is exposed to a uniform surface pressure, for instance through a press diaphragm 19, governed by a positive pressure. At the same time, the structural sheet or plate 17 is heated through a fibre reinforced conveyor belt 20 by a heater plate 21 in the vulcanizing press to a predetermined temperature. If article 8 has been given a pile layer at its top, this will be between the diaphragm and the rubber article 8 top and thus during the vulcanizing process at the same time be vulcanized on to the article 8. The surface pressure applied from the diaphragm 19 has been adapted so as to be sufficiently high to deform article 8 plastically at its bottom side complementary to the structural sheet or plate surface structure while at the same time the temperature in article 8 from heater plate 21 has been adapted so as to be sufficiently high for article 8 to be softened or vulcanized. Before article 8 is placed on structural sheet or plate 17, label 9 is placed with plastic foil bearing against structural sheet or plate 17 and with printing ink 11 facing away from structural sheet or plate 17 after which article 8 is placed on top of label 9. During the press vulcanizing operation the printing ink of the label 9 will for one thing be vulcanizd with rubber article 8 and also be plastically deformed with this complementary to the structural sheet or plate 17 moulding surface 14 so that the bottom of article 8 with label 9 takes on the complementary shape of moulding surface 14, and after finishing the vulcanizing process where the diaphragm 19 is withdrawn from the article, and the article is removed from the moulding surface 14 for cooling, the plastic foil 10 may be removed after which the bottom of the article will have a bottom side shape such as that of the article shown in FIG. 2. The plastic foil 10 strength may in this connection not be so high that it may prevent the rubber article and the printing ink from being plastically deformed during the pressing operation down into the structural sheet or plate 17 openings or indentations 18.

The structural sheet or plate 17 used may at least have virtually the same length and width as that of the rubber article to be made, and the part of the structural sheet or plate 17 surface 14 engaging with article 8 or printing ink 11 has been designed so as to have poor adhesion on rubber materials.

Instead of a structural sheet or plate 17, a structural belt may be used which after the press operation is shifted a mat width in a direction at right angles to the press direction. The fibre reinforced conveyor belt 20 forming where the structural sheet or plate has throughgoing openings the bottom of these should also be designed so as to have poor adhesion on the materials moulded. The structural sheet or plate and possibly also the conveyor belt 20 should be heat conducting, uncompressible, and preferably have a wall thickness of 1-5 mm where 1½ mm wall thickness has been used successfully. Silicone rubber characteristics for structural sheet or plate 17 and/or conveyor belt 20 may be appropriate for certain purposes. The structural sheet or plate 17 may be of stainless steel, and the conveyor belt may be of woven stainless steel. This offers fine heat-conducting qualities.

The moulding surface 14 and the imprinted plastic foil 10 placed on same and the vulcanizable rubber article 8 are preheated appropriately to a temperature ranging from 4° to 90° C., preferably 20° C. below the vulcanizing temperature applied during the press vulcanizing process before the latter takes place.

A label highly suitable for the method consists of a plastic foil material of a thickness of 10-100 micron upon which using a printing ink 11 of vulcanizable rubber material inverted text, figures and/or pictures have been printed.

Foil material 10 is selected appropriately from the group consisting of polyethylene chloride, polyethylene, polypropylene, polyurethane, polyvinyl chloride, and copolymers. Wherever polyvinyl chloride is used, this will appropriately have a melting point of appr. 220° C. Wherever polyethylene is used, this may have a melting point of 130°-170° C. A highly suitable copolymer may consist of 80% polyethylene and 20% polypropylene.

The printing ink 11 which may be natural or synthetic rubber has been appropriately selected among such rubbers which are compatible with at least one material in the group of: Natural latex, nitrile latex, styrene butadiene rubber, and carboxylated rubber.

I claim:

1. A service mat having an upper textile layer with a pile surface and a lower backing layer of a rubber material vulcanized thereto, the improvement comprising: information indicia of a rubber material compatible with the rubber material of the backing material vulcanized directly to the backing material and having a color different than that of the backing material so that the indicia can be readily read.

2. The service mat of claim 1 wherein said rubber material of said indicia information is a material selected to be compatible with nitrile latex, natural latex, styrene butadiene rubber, natural rubber, nitrile rubber or carboxylated rubber.

3. Method for production of a rubber material article on which is vulcanized information indicia comprising the steps of: providing a rubber material article on which information indicia is placed, providing a foil material having information indicia of rubber material compatible with the article on which it is to be placed and in mirror image form of a color different than that on which it is to be placed, placing the foil material on a molding surface with the information indicia facing away from the molding surface, placing the rubber material article over the information indicia on the foil, applying heat and pressure to the article and the foil material to vulcanize the information indicia to the article, allowing the article and foil material to cool and stripping the foil material from the article leaving the information indicia adhered to the article.

4. The method of claim 3 wherein the article and foil material are preheated to a temperature between 4° C. and 90° C. below the vulcanizing temperature.

5. The method of claim 3 wherein the article and foil material are preheated to about 20° C. below the vulcanizing temperature.

6. The method of claim 3 wherein the rubber material on the foil material may be natural or synthetic rubber which is compatible with natural latex, nitrile latex, styrene butadiene rubber, natural rubber, nitrile rubber or carboxylated rubber.

7. The method of claim 6 wherein the foil material has a thickness of 10-100 microns and is selected from a group consisting of polyethylene chloride, polyethylene, polypropylene, polyurethane, polyvinyl chloride and polymers.

* * * * *